F. J. GUCKEN.
MOTOR STARTING DEVICE.
APPLICATION FILED APR. 22, 1908.
916,303.
Patented Mar. 23, 1909.
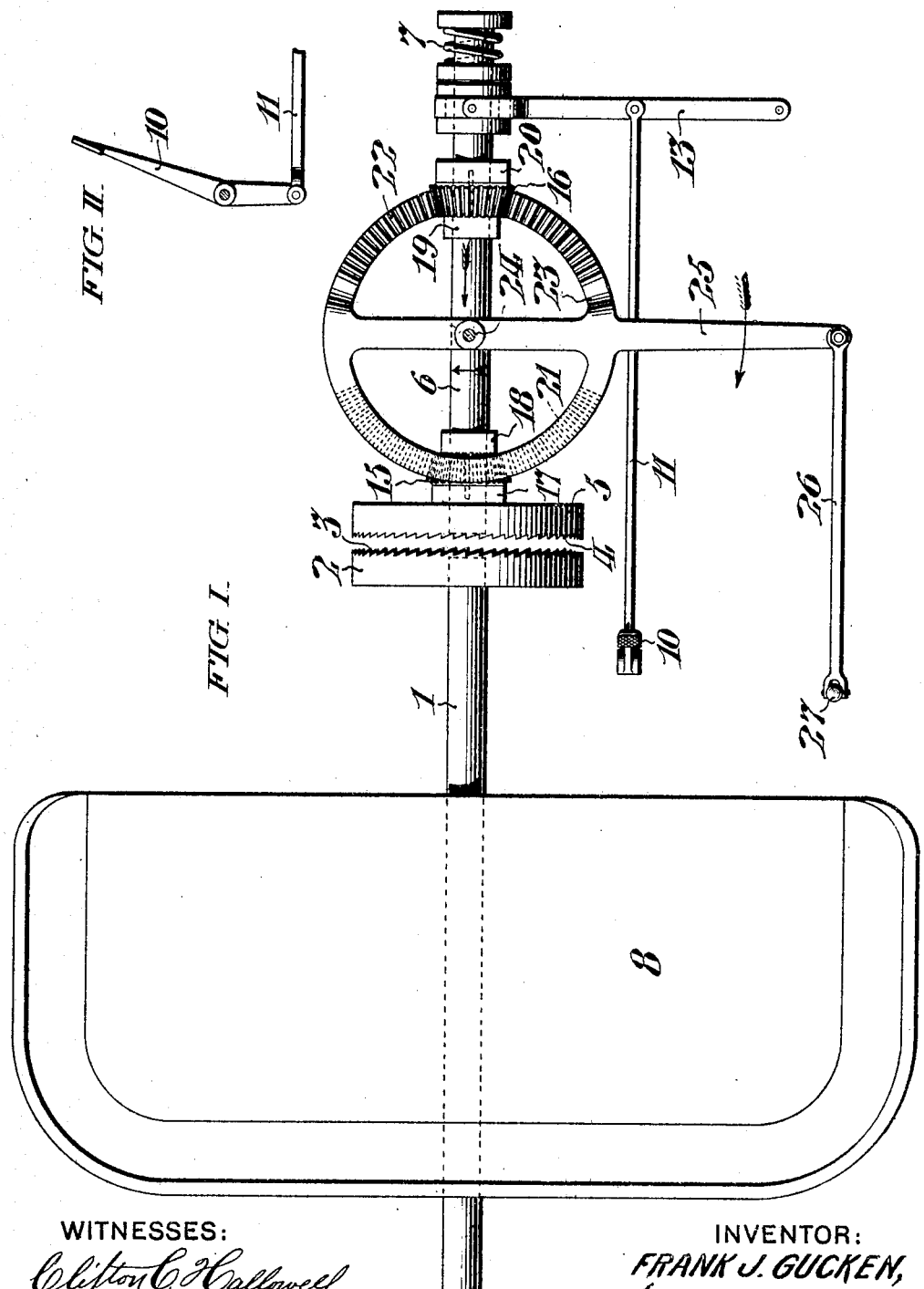
WITNESSES:
Clifton C. Hallowell
Thomas W. Kerr
INVENTOR:
FRANK J. GUCKEN,
by Arthur E. Paige
Atty.

UNITED STATES PATENT OFFICE.

FRANK J. GUCKEN, OF PHILADELPHIA, PENNSYLVANIA.

MOTOR-STARTING DEVICE.

No. 916,303.  Specification of Letters Patent.  Patented March 23, 1909.

Application filed April 22, 1908. Serial No. 428,565.

*To all whom it may concern:*

Be it known that I, FRANK J. GUCKEN, of Philadelphia, in the State of Pennsylvania, have invented a certain new and useful Improvement in Motor - Starting Devices, whereof the following is a specification, reference being had to the accompanying drawings.

My improvement is particularly applicable to an automobile motor comprising an internal combustion engine, having a crank shaft which must be rotated to start it. Ordinarily, such starting movement is effected by a handle applied exterior to the vehicle, and it is necessary for the operator to dismount to manipulate said handle.

Therefore, it is an object of my invention to provide means whereby the operator may start such a motor, by rotation of its crank shaft, without leaving his seat in the vehicle.

My invention comprises the various novel features of construction and arrangement hereinafter more definitely specified.

In the drawings; Figure I, is a plan view diagrammatically indicating the essential elements of my invention. Fig. II, is a fragmentary side elevation showing the relation of some of said elements.

In said drawing; the crank shaft 1, of the motor is provided with the clutch disk 2, having teeth 3, arranged to be engaged by the teeth 4, on the clutch disk 5, which is carried by the auxiliary shaft 6. Said shaft 6, is normally shifted by the spring 7, to the position shown in Fig. I, so as to disengage the teeth of said disks.

When it is desired to start the motor the operator may, without leaving the seat 8, press upon the foot lever 10, connected by the link 11, to the lever 13, and thus shift the shaft 6, in the direction of the arrow marked thereon, to engage said clutch teeth 3 and 4. Said shaft 6, turns the bevel gears 15, and 16, but may be shifted longitudinally therethrough, while said gears are held in place by the lugs 17, 18, 19 and 20. Said gears 15, and 16, are respectively in mesh with the teeth 21, and 22, on the rocker frame 23, which is pivoted at 24, and has its lever arm 25, connected by the link 26, to the starting lever 27, which is manually operated and is conveniently accessible from said operator's seat 8. As shown, the gear sectors comprising said teeth 21 and 22, extend respectively above and below the gears 15 and 16, so as to turn the latter in the same direction, indicated by the arrow marked on the shaft 6, when the rocker frame 23, is turned in the direction of the arrow marked on its arm 25.

It is to be understood that by means of the foot lever 10, the operator may, at will, engage and release the clutch members 2 and 5, and that when said members are engaged and the rocker frame 23, is turned by means of the hand lever 27, as aforesaid, the crank shaft is correspondingly rotated, in the direction of the arrow marked thereon, to start the engine. However, it may be observed that the shape of the clutch teeth 3 and 4, is such that when the motor shaft 1, is turned by the engine in the direction of the arrow marked on said shaft 6, said teeth are automatically disengaged, even if the operator is pressing upon the foot lever 10, and, whenever the operator releases the foot lever 10, said clutch members 2 and 5, are automatically disengaged by the spring 7, withdrawing the clutch member 5, by its shaft 6, to the position shown in the drawing.

I do not desire to limit myself to the precise details of construction and arrangement above described, as it is obvious that various modifications may be made therein without departing from the essential features of my invention, as defined in the appended claims.

I claim:—

1. The combination with a rotary motor shaft provided with a toothed clutch member; of an auxiliary shaft provided with a toothed clutch member complementary to the other member; bearings supporting said auxiliary shaft for longitudinal reciprocation; means arranged to reciprocate said auxiliary shaft, to engage and disengage said clutch members, comprising a spring tending to shift said shaft to disengage said clutch members, a lever arranged to engage said clutch members, and, a link connecting said clutch lever with a foot lever; two bevel gear wheels mounted on said auxiliary shaft to turn therewith; a rocker frame pivoted concentrically with respect to said bevel gears and comprising two bevel gear sectors extending respectively above and below said bevel gears; a lever arm extending from said rocker frame; and, means arranged to oscillate said lever arm, comprising a link operatively connected with a handle lever.

2. The combination with a rotary motor shaft provided with a toothed clutch member; of an auxiliary shaft provided with a toothed clutch member complementary to the other member; bearings supporting said auxiliary shaft for longitudinal reciprocation; means arranged to reciprocate said auxiliary shaft, to engage and disengage said clutch members, comprising a spring tending to shift said shaft to disengage said clutch members, a lever arranged to engage said clutch members, and, a link connecting said clutch lever with a foot lever; two bevel gear wheels mounted on said auxiliary shaft to turn therewith; a rocker frame comprising gear sectors engaging said bevel gears; a lever arm extending from said rocker frame; and, means arranged to oscillate said lever arm, comprising a link operatively connected with a handle lever.

3. The combination with a rotary motor shaft provided with a toothed clutch member; of an auxiliary shaft provided with a toothed clutch member complementary to the other member; means arranged to engage and disengage said clutch members, comprising a spring tending to disengage them, and, a lever arranged to engage them; a bevel gear wheel mounted on said auxiliary shaft to turn therewith; a rocker frame comprising a gear sector engaging said bevel gear; and, means arranged to oscillate said rocker frame.

In testimony whereof, I have hereunto signed my name at Philadelphia, Pennsylvania, this twenty-first day of April, 1908.

FRANK J. GUCKEN.

Witnesses:
ARTHUR E. PAIGE,
ANNA F. GETZFREAD.